United States Patent [19]

Klein et al.

[11] 4,192,038
[45] Mar. 11, 1980

[54] APPARATUS FOR CLEANING AND/OR COATING

[76] Inventors: Bernard J. Klein, 140 Peach Dr., Rosyln, N.Y. 11576; Samuel D. Verga, 75 W. 238th St., Bronx, N.Y. 10463

[21] Appl. No.: 972,455

[22] Filed: Dec. 22, 1978

Related U.S. Application Data

[63] Continuation of Ser. No. 692,543, Jun. 3, 1976, abandoned.

[51] Int. Cl.$^2$ .............................................. B60S 1/46
[52] U.S. Cl. ................. 15/250.06; 15/250.04; 15/250.41
[58] Field of Search ............ 15/250.01, 250.09, 250.4, 15/250.41

[56] References Cited

U.S. PATENT DOCUMENTS

| 1,647,319 | 11/1927 | Shults et al. | 15/250.04 |
| 2,562,302 | 7/1971 | Downey | 15/250.04 |
| 2,721,351 | 10/1955 | Nitzel et al. | 15/250.06 |
| 2,918,689 | 12/1959 | Pruett | 15/250.04 |
| 3,116,510 | 1/1964 | Oishei et al. | 15/250.42 |

FOREIGN PATENT DOCUMENTS

| 1217562 | 12/1959 | France | 15/250.04 |
| 1282710 | 12/1971 | France | 15/250.09 |

*Primary Examiner*—Peter Feldman
*Attorney, Agent, or Firm*—Pennie & Edmonds

[57] ABSTRACT

Apparatus for cleaning and/or coating generally smooth surfaces and the like comprising a generally elongated unitary movable member including a pair of spaced apart and generally parallel blade projections, each extending from and along one surface of the unitary member and being adapted to contact the surface such that whenever said unitary member moves in one direction, one of the projections serves as a leading blade for removing surface dirt from the surface, and the other of the projections serves as a trailing blade which functions to evenly wipe the surface. The other projection also serves as a leading blade which removes the dirt from the surface and the one projection serves as a trailing blade for evenly wiping the surface in response to movement of the wiper member in the opposite direction. The apparatus also contemplates conduit means connected to the unitary member between the projections such that it is spaced from the surface for directly applying an appropriate fluid onto the surface between said blade projections for cleaning and/or coating the surface. In a preferred embodiment the apparatus is a windshield wiper which is adapted to clean windshields.

5 Claims, 8 Drawing Figures

APPARATUS FOR CLEANING AND/OR COATING

This is a continuation of application Ser. No. 692,543, filed June 3, 1976, now abandoned.

BACKGROUND OF THE INVENTION

1. Field of the Invention

This invention is related to a cleaning and/or coating apparatus and, more particularly, to a novel and improved windshield wiper for cleaning windshields or the like.

2. Description of the Prior Art

Heretofore, it has been rather common practice to clean windshields on vehicles or the like with a windshield wiper having a single blade. Through the use of such single blade there is often a tendency for the dirt and other forms of debris which may have accumulated on the windshield to smear thereacross during normal operation of such wiper. Such adverse effects principally arise from the fact that the single blade must function to remove the dirt and conjointly wipe liquid from the windshield. In general, however, the single blade does not adequately perform in such a manner because dirt and debris remain. In addition, this resulting smear of debris will form a thin film. The consequent adverse effect of such film is that it tends to serve to hinder proper visibility. Accordingly, as is believed evident, a somewhat dangerous condition may arise.

Ordinarily, to clean the windshield surfaces of dirt and other debris, especially whenever such surfaces are dry, the conventional approach is to direct streams of cleaning fluid from separate nozzles situated at the base of and in front of the windshield. Still other forms of windshield wipers exist which essentially operate to discharge fluid onto the windshield surface from the wiper as the wiper traverses in the normal fashion across such surface. One such windshield wiper of this latter category is described in U.S. Pat. No. 2,069,699, wherein there is disclosed a blade having ports or openings located outwardly adjacent a pair of wiper ribs. The ports are in fluid communication with a chamber that carries a solution adapted to be applied to the windshield. Another of such latter category of wiper devices is generally described in U.S. Pat. No. 1,868,783. As disclosed therein, a fluid discharge tube having perforations is situated between a pair of wiper layers so that the discharged fluid will flow between the scrubbing edges of the wiper member so as to be spread by the layers on the windshield glass for purposes of softening the dirt. These devices are, in general, relatively complicated in construction and use.

Still another kind of windshield wiper arrangement includes fluid discharge passages for dispensing a cleaning fluid located between a pair of wiper blades and is described generally in U.S. Pat. No. 2,648,865. Although such a relationship of discharge ports between the blades serves to enhance the operation of the windshield blades it nonetheless suffers from certain shortcomings. One primary disadvantage of this particular structural arrangement is its rather complicated construction since it comprises several distinct pieces assembled and connected together. As will at once be appreciated, such an assembly would be relatively commercially expensive to produce and assemble. Such economic considerations are rather significant in connection with the highly competitive automobile industry, since relatively complicated devices are, in practice, often commercially impractical. Accordingly, it will be appreciated that even slight savings in cost will significantly enhance the commercial appeal and adaptability of a particular component or assembly to mass production. Moreover, the tubular element defining the fluid carrying passage is exposed to the surrounding environment. The adverse consequence which may be attributed to this form of construction is the likelihood that the tubular element may be easily punctured or abraded or in some other way damaged, such that it might be subject to leakage and thereby be unable to satisfactorily perform. A further disadvantage associated with the foregoing described wiper is its lack of versatility by reason of it being impossible to use two wiper blades without the use of the passage for distributing the cleaning fluid. Consequently, this particular type of wiper blade is unable to have the fluid carrying tubular member replaced should the occasion arise while still retaining use of the twin wiper blades. Of course, such a situation has a tendency to make this particular wiper blade assembly unsatisfactory should the tubular passage develop a leak of some type.

None of the previously described prior art windshield wipers, however, provide a simple and reliable wiper which essentially functions to hold a conduit having fluid discharge openings between and interior of a pair of axially spaced wiper blade projections such that cleaning and/or coating fluids are dispensed directly on the windshield between the spaced pair of blade projections. The foregoing arrangement permits the blades and fluid to be more efficiently and effectively used, since the fluid will be discharged after the leading or cleaning blade projection has wiped away dirt and other debris from the windshield, and before the trailing blade wipes clean the surface. Moreover, other known devices fail to provide adequate and simple arrangements which facilitate quick, easy, and yet reliable attachment and/or replacement of a fluid conduit for a windshield wiper blade whereby the blade may properly continue to operate should the occasion arise wherein the fluid conduit needs replacement.

SUMMARY OF THE INVENTION

Briefly, in accordance with the present invention, it is an object thereof to overcome the previously mentioned disadvantages associated with prior art windshield wiper blades. The instant invention contemplates a novel and improved apparatus for effectively and efficiently cleaning and/or coating generally smooth surfaces, such as windshields and the like.

Essentially, the apparatus envisioned includes a unitary, generally longitudinally extending and movable blade member which is adapted to be oscillated across the generally smooth surface in the customary manner. Such blade member includes a pair of spaced and generally parallel blade projections. Each projection extends from and along one surface of the unitary member and is adapted to contact the generally smooth surface such that whenever the unitary movable member moves in one direction, one of the projections serves as a leading blade for removing surface dirt from the surface, and the other of the projections serves as a trailing blade which functions to evenly wipe the smooth surface. The other projection also serves as a leading blade which removes the dirt from the surface and the one projection serves as a trailing blade for evenly wiping the surface in response to movement of the member in the opposite direction. The apparatus also contemplates conduit means connected to the one surface of the unitary member between the projections such that it is spaced from the surface for directly applying an appropriate fluid onto the surface between said blade projections for cleaning and/or coating the surface.

An embodiment of this invention comprises retaining means provided for detachably connecting the conduit means to the one surface of the member between the projecting blades for purposes of protecting and facilitating the removal of the conduit means.

Another embodiment of the foregoing type apparatus is a windshield wiper which may include a heating element embedded therein for serving the purpose of keeping the wiper in a pliable frost-free condition.

BRIEF DESCRIPTION OF THE DRAWINGS

The above and other objects, features, and advantages of the present invention will become readily apparent upon a reading of a detailed description thereof when viewed in conjunction with the accompanying drawing wherein like reference numerals indicate like structure throughout the several views.

FIG. 1 is a diagrammatic view illustrating the novel and improved windshield wiper made in accordance with the present invention and being adapted to a conventional windshield wiper system in an automotive vehicle and the like;

FIG. 2A illustrates a conventional form of windshield wiper arrangement to which another embodiment of the novel and improved wiper of the present invention may be connected to;

DETAILED DESCRIPTION

Figure 1:
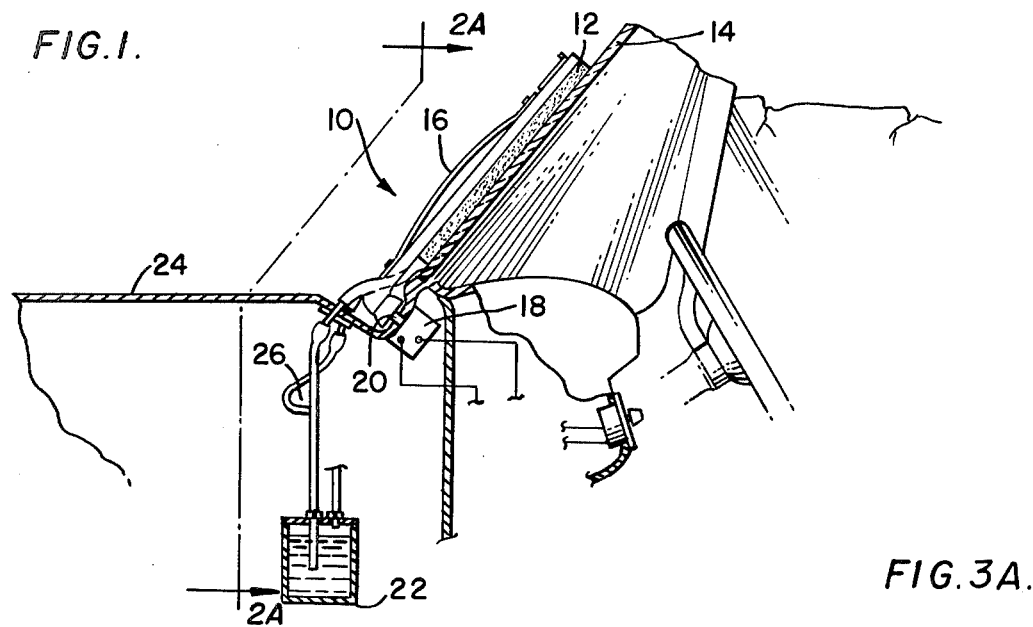

Referring to the drawing, and, in particular, FIGS. 1, 2A, 3A and 5, there is illustrated one embodiment of an apparatus 10 for cleaning and/or coating including a windshield wiper member which is made in accordance with the principles of the present invention and being generally designated by reference numeral 12. The windshield wiper member 12 is adapted, in a well-known fashion, to slidably engage and traverse a windshield surface 14 of an automobile or the like.

Although the succeeding description discloses the use of a wiper member 12 adapted for use in connection with cleaning an automobile windshield surface 14, the scope of this invention, of course, envisions other suitable applications therefor.

For instance, the present invention contemplates that wiper member 12 can be applied for cleaning other generally flat or curved smooth surfaces. In addition, wiper member may serve to suitably and evenly apply other than a cleaning solution for cleaning purposes. An anti-freezing or anti-fogging substance could, for example, be applied to the windshield in lieu of the cleaning solution. Consequently, it is apparent that other forms of substances may be applied to a smooth surface for reasons of cleaning and/or coating without departing from the spirit and scope of this invention.

Figure 2A:
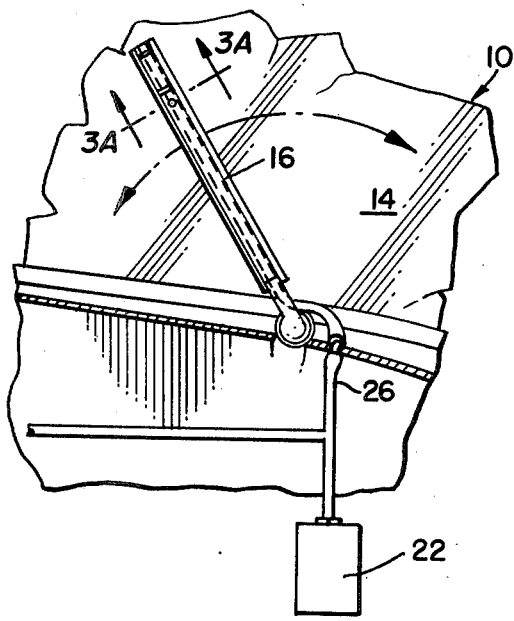
Figure 3A:
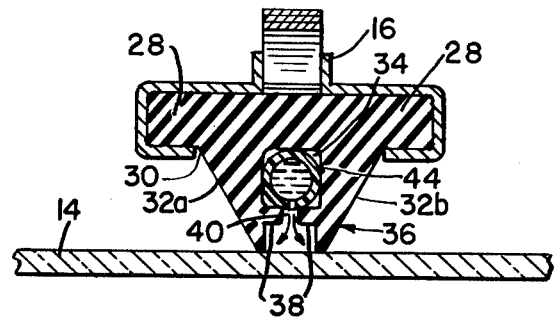
FIG. 3A is an end sectional view taken substantially along section line 3A—3A appearing in FIG. 2A looking in the direction of the arrows and illustrating the wiper blade as well as the manner by which such wiper blade is connected to a portion of the windshield wiper arrangement.
Figure 4:
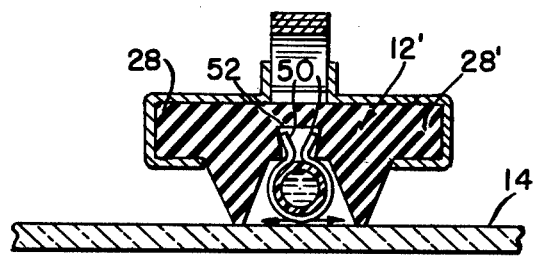
FIG. 4 is an end sectional view similar to FIG. 3A but, however, illustrating another embodiment of the wiper blade made in accordance with the present invention.

Windshield wiper member 12 operatively interfits and cooperates with a suitable and conventional type of elongated wiper arm 16, such as illustrated in FIGS. 2A, 3A and 4. Generally, the driving system connected to and employed for oscillating the wiper arm 16 is conventional and brief reference will, therefore, be made to such system for the purpose of illustration. In regard to such system reference is made to FIG. 1, where there is shown a typical driving motor 18, mechanically connected to any known form of coupling apparatus 20 to the bottom of wiper arm 16 so that the latter may be oscillated about a fixed axis in response to energization of the motor. A suitable fluid reservoir 22 containing cleaning fluid is situated beneath automobile hood 24 and is selectively operated, in a customary fashion, by a pump (not shown) to pump the cleaning fluid to the cleaning apparatus, in a known manner, through fluid supply line 26.

Figure 5:
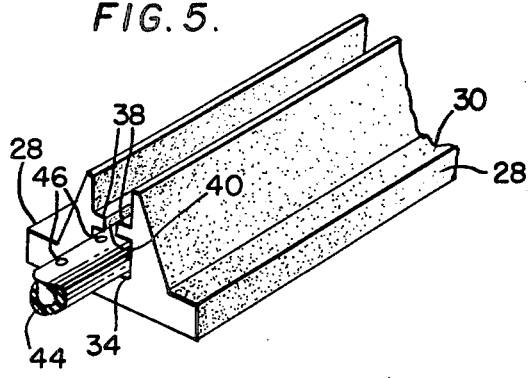
FIG. 5 is a perspective view of the novel and improved wiper blade of FIG. 3A showing a conduit tube being received by a pair of retaining lips on the wiper blades.

As perhaps more clearly depicted in FIGS. 3A and 5, the wiper blade member 12 is defined by a generally elongated unitary body having at the top end thereof, two laterally protruding flanges 28 and extending downwardly and axially along the extent of a bottom surface 30, a pair of integral and discrete wiper blade projections 32a and 32b. As noted, wiper blade projections 32a and 32b are arranged in a substantially parallel and spaced apart relationship with respect to each other. The wiper blade projections 32a, 32b are adapted to engage the windshield surface 14 for purposes afterwards made clear. In this spaced apart and parallel relationship, wiper blade projections 32a, 32b define therebetween a longitudinally extending channel 34. It is contemplated that wiper blade member 12 be made of a suitable and conventional type of resilient material, such as is standard for automobile type wiper blades. Consequently, the wiper blade member 12 will be sufficiently resilient so as to enable it to bend for purposes subsequently made evident.

In accordance with the present invention retaining means 36 are also provided. Referring to the embodiment as shown in FIGS. 3A and 5, the retaining means 36 include retaining lip members 38. It will be seen that each retaining lip member 38 is integrally formed with each projection 32a, 32b to extend inwardly towards the other. The instant invention envisions that retaining member 38 can be formed continuously or discontinuously along the axial extent of each blade projection 32a, 32b. The present embodiment contemplates continuously formed retaining lip members 38. It will be further noted that respective ones of the retaining or lip members 38 have their free ends spaced apart from each other by a sufficient dimension to define a suitable passage space 40 therebetween. Passage space 40 permits the passage of the cleaning fluid so that such fluid may be directly applied to the windshield surface 14. Additionally, it will be observed that the retaining members 38 are formed so as to be spaced a suitable distance from the apex of each of the projections 32a, 32b. Accordingly, the retaining members 38 will be appropriately spaced from the windshield surface 14. The particular significance of the foregoing relationship will be subsequently made clear.

Owing to the particular inherent resiliency of the wiper blade member 12, respective blade projections 32a and 32b, as well as the corresponding retaining lip members 38, can be suitably spread apart for purposes of inserting and removing conduit means 42 between such projections 32a, 32b and retaining lip members 38. By virtue of the resiliency of blade member 12 the conduit means 42 can be detachably connected to wiper blade member 12.

In connection with the conduit means 42, such is basically defined by a generally elongated resilient tubular member 44. A plurality of passages 46 are formed in a linearly and intermittently spaced fashion along the axial extent of the tubular member 44 so as to provide for discharge of the cleaning fluid. It will be appreciated that passages 46 are to be located so as to be between or adjacent the passage space 40. Elongated tubular member 44, as indicated, is adapted to be removably inserted between the wiper blade projections 32a, 32b and held by retaining lip members 38. The lower end of the tubular member 44 may be connected by any suitable fluid connecting arrangement to the supply line 26.

By virtue of the above constructional arrangement, it will be appreciated that the tubular fluid conduit 44 is advantageously centrally protected from the outside and spaced away from the windshield surface 12. As a result the likelihood that the material of conduit 44 will be abraded and/or exposed in such fashion that it might otherwise be punctured or fail, thereby rendering it ineffective for its intended use, is substantially eliminated. Additionally, the conduit 44 is centrally located between the pair of wiping blade projections 32a, 32b so as to dispense the cleaning fluid in an efficient manner. The foregoing is especially significant from the standpoint of providing a wiper blade member 12 which can effectively and efficiently wipe and clean the windshield surface 14 without the associated disadvantages of smearing.

With reference to FIG. 2A, whenever the wiper motor 18 is appropriately energized, it will, in a well-known manner, serve to oscillate the wiper arm 16 transversely across windshield surface 14. It will be understood that as the wiper blade member 12 advances across the windshield surface 14, in a direction indicated by arrow A, the leading projection 32a will function to clean the windshield surface 14 free of dirt and other debris accumulated on the surface. During such traversing movement, the cleaning fluid is appropriately dispensed between the blade projections 32a, 32b. Such fluid will serve to appropriately moisten the dirt. As a result thereof, the trailing blade projection 32b is able to more advantageously wipe clean surface 14.

Consider now, for example, that the wiper blade member 12 is oscillated in the opposite direction. During the course of such reverse movement, the projection 32b which was once the trailing edge will become the leading edge while former leading wiper blade projection 32a becomes the trailing blade projection. Of course, in this latter regard, each of the projections 32a, 32b will correspondingly function in the opposite manner to clean the windshield surface 14. Consequently, an extremely simple, yet highly reliable arrangement is provided for cleaning dirt and other accumulated debris from windshield surface 14 or other suitable surface.

It will be recognized that by having the fluid conduit 44 centrally and internally disposed between wiper blade projections 32a and 32b, as well as being spaced from surface 14, a cleaning apparatus is provided which functions to more effectively and advantageously clean windshield surfaces or the like and avoid the tendency of the dirt or other debris to smear across the surface thereof during the cleaning.

Additionally, since the retaining lip members 38 are suitably spaced apart and are flexible they enable easy placement as well as replacement of the conduit 44. Accordingly, the wiper blade member 12 may be used independently of but, preferably, with the conduit 44. This is particularly advantageous should, for example, the central conduit 44 need replacing since the entire blade member 12 does not have to be removed from the wiper arm 16 in order to have each conduit replaced. Accordingly, a versatile cleaning apparatus results.

Figure 6:
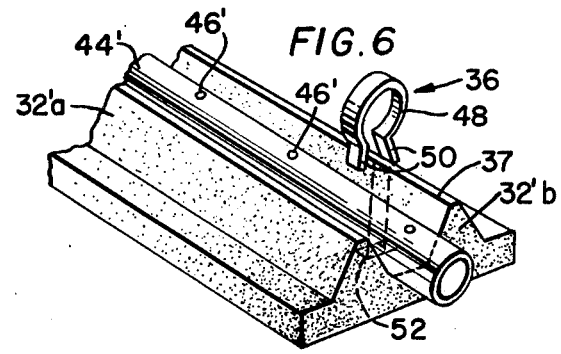
FIG. 6 is a perspective view of the novel and improved wiper blade illustrating with somewhat greater clarity the manner by which one form of retaining means of the instant invention operatively cooperates with the wiper blade member.

Referring to an alternate embodiment of this invention, reference is made to FIGS. 4 and 6. Structure of the second embodiment which is similar to the first embodiment will be represented by like reference numerals with, however, the addition of a prime marking.

In the particular embodiment being described, retaining means 36 is comprised of a plurality of discrete generally U-shaped resilient clasping members 48 having a pair of outwardly projecting tangs 50. Each clasping member 48 is adapted to snugly cooperate about a peripheral portion of conduit 44' to secure the latter to wiper body member 12'. The tangs 50 project into suitably formed recesses 52 longitudinally and intermittently spaced along the wiper blade member 12'. By reason of the inherent resiliency of the clasping members 48, the tangs 50, which normally tend to move apart from each other, expand and frictionally cooperate with walls forming recesses 52. Through the utilization of a plurality of such clasping members 48, conduit tubing 44' is rather securely fit within, and connected to the wiper blade 10' for repeated movement. To remove clasping members 48 from the wiper blade member 12', so as to, for instance, permit replacement of conduit 44' the clasping members 48 are pressed or pinched so that tangs 50 no longer engage the walls of the recesses 52. In such a manner, withdrawal of the clasping member 48 is easily accomplished.

While the above embodiment discloses an alternate manner for use in detachably connecting the conduit 44' to wiper member 12', it should be emphasized that the present invention envisions that other similarly formed retaining constructions may be realized for application in conjunction with the present invention so long as they enable not only a secure retention of a conduit fluid between blade projections but also their removal as well.

Figure 2:
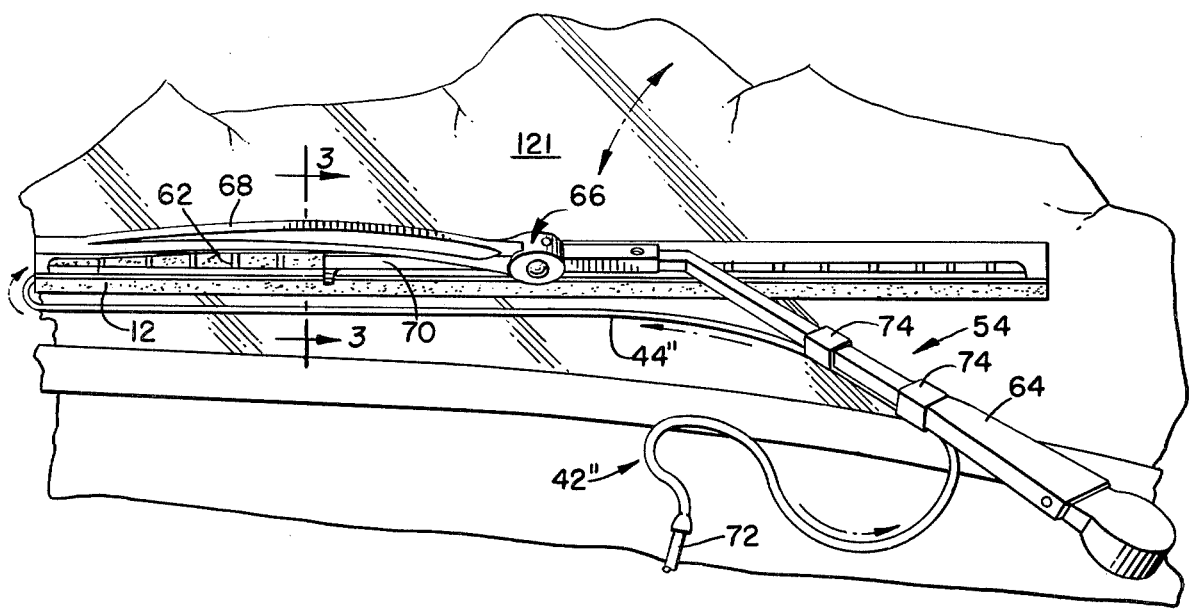
FIG. 2 is a diagrammatic view of one embodiment wherein the windshield wiper of the present invention is connected to a conventional windshield wiper arrangement and illustrating its normal path of movememt during operation.
Figure 3:
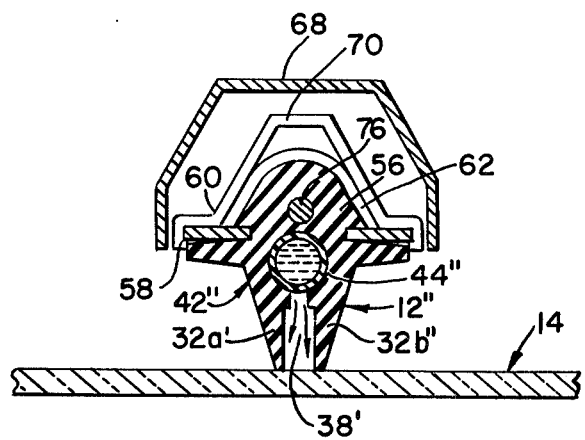
FIG. 3 is an end sectional view taken substantially along section line 3—3 appearing in FIG. 2 and looking in the direction of the arrows and illustrating one embodiment of the wiper blade being connected in a suitable fashion to a wiper blade holder.

Particularly referring to FIGS. 2 and 3 there is shown yet another embodiment of the present invention associated with a conventional windshield wiper assembly 54. Since the windshield wiper assembly 54 is so well known exact details of its structure will be omitted.

However, only those portions relevant to our discussion will be mentioned. Structure of this embodiment which generally corresponds to the first described embodiment will be represented by like reference numerals with, however, the addition of a double prime marking. As is apparent from viewing wiper blade 12", such is somewhat different in that the top end thereof instead of being flat has a head portion 56 with a generally rounded configuration. Head portion 56 is conventionally connected to a conventional wiper carrier of holder indicated by reference numeral 58.

The wiper assembly 54 includes wiper holder 58 which may be fabricated from metal and is formed with an elongated slot 60 having arcuate ribs 62. The head portion 56 is squeezed within the slot 60. Holder 58 is also affixed to the wiper driving arm 64 by a known connecting assembly 66 which includes bendable cover member 68 and a standard clamping member 70. The wiper driving arm 64 is oscillated to advance the wiper holder 58 and blade 12" associated with the wiper holder in a to and fro manner across the windshield 14.

It will be understood, of course, that the wiper blade holder 58 may have other known configurations. It will also be understood that the wiper blade member 12" can have a wide variety of configurations which enable it to be connected to other well known kinds of wiper holders. Consequently, the present depiction is being given for purposes of illustration. Therefore, it should not be construed as a limitation.

Conduit means 42" includes suitable flexible tubing 44" which is connected as to the wiper blade 12" and between blade projections 32a'", 32b". The other end of flexible tubing 44" is attached to and in fluid communication with standard spray nozzle 72 situated in front of the windshield 14. Appropriate clamping devices 74 secure the tubing 44" to the driving arm 64. By the foregoing arrangement, fluid will flow into tubing 44" where it will be discharged onto the windshield 14 between blade projections 32a" and 32b" instead of being sprayed onto the windshield. Accordingly, the wiper blade 12" will be able to function in a manner previously noted.

This particular embodiment includes a heating element 76. Heating element 76 may be formed from an appropriate electrical resistance element and extend through at least a portion of the entire longitudinal extent of wiper blade 12". In this particular structural arrangement current may be applied to the heating element 76 from a suitable electrical source suitably connected thereto. Upon application of current, element 76 is suitably heated. As a consequence thereof, the wiper blade 12" will remain pliable notwithstanding freezing temperature conditions. Thus, wiper blade 12" may be used in an unfrozen and frost-free condition notwithstanding freezing conditions.

In all of the previously observed modifications for the wiper blade, the fluid actually dispensed was described as a cleaning solution. However, consistent with the principles of this invention, such fluid can be any cleaning and/or coating substance. Anti-freezing and anti-fogging mediums, for example, may be used instead of a cleaning solution. Other forms of treating solutions for correspondingly different purposes can be applied. It will be apparent that no matter what solution is actually applied the wiper blade projections will function as indicated above to clean or coat the smooth surface.

After having described the above organization of components, it is believed that the normal operation thereof is readily apparent.

The above organization of components achieves with a few simplified components a cleaning and/or coating apparatus which is particularly adapted for advantageously coating and/or cleaning surfaces of accumulated dirt and debris without leaving smear or smudge marks. Moreover, the above arrangement protects a central fluid carrying conduit for wiper blades from weather elements and abrasive type wearing action which might lead to its failure. Apart from the preceding significant advantages, the above cleaning arrangement provides an inexpensive and reliable wiping blade member with improved wiping action which is usable with or without a fluid carrying conduit.

While the invention has been described in connection with the preferred embodiments, it is not intended to limit the invention to the particular forms set forth above, but, on the contrary, it is intended to cover such alternatives, modifications, and equivalents as may be included within the spirit and scope of the invention as defined by the appended claims.

What is claimed is:

1. Apparatus for cleaning and/or coating generally smooth surfaces and the like comprising a generally elongated unitary member including a pair of spaced apart and generally parallel blade projections extending from and along one side thereof and being adapted to contact the surface such that whenever said unitary member is positioned against the surface and is moved in a first direction, a first projection serves as a leading blade for removing surface dirt from the surface, and the second projection serves as a trailing blade which functions to evenly wipe the surface, and when said unitary member is moved in the opposite direction said second projection serves as a leading blade which removes the dirt from the surface and said first projection serves as a trailing blade for evenly wiping the surface, conduit means positioned between said projections such that it is spaced from the surface, said conduit means having a plurality of spaced passages for dispensing a plurality of streams of an appropriate fluid directly onto the surface between said blade projections for cleaning and/or coating the surface, at least one flexible lip member formed integrally with each of said projections, said lip members being generally perpendicular to their associated projection and extending toward each other and in combination, over a major portion of the space between said projections so as to retain said conduit means in position therebetween, the free end portions of said lip members being separated by a space which permits the passage of the streams of fluid from said conduit means and said lip members being movable generally apart from each other for permitting removal and/or replacement of said conduit means between said projections.

2. Apparatus as set forth in claim 1 which further includes heating means embedded within at least a portion of said wiper member.

3. An apparatus as set forth in claim 1 in which said conduit means includes a generally longitudinally extending flexible tubular member.

4. Apparatus for cleaning and/or coating windshield surfaces and the like comprising a generally elongated flexible, resilient unitary member including a pair of spaced apart and generally parallel blade projections extending from and along one side therof and being adapted to contact the windshield surface such that whenever said unitary member is positioned against the surface and is moved in a first direction, a first projection serves as a leading blade for removing surface dirt from the windshield, and the second projection serves as a trailing blade which functions to evenly wipe the surface of the windshield, and when said unitary member is moved in the opposite direction said second projection serves as a leading blade which removes the dirt from the windshield surface and said first projection serves as a trailing blade for evenly wiping the surface of the windshield, a tubular member positioned between said projections such that it is spaced from the windshield surface, said tubular member having a plurality of spaced passages for dispensing a plurality of streams of an appropriate fluid directly onto the surface between said blade projections for cleaning and/or coating the surface, at least one flexible lip member formed integrally with each of said projections, said lip members extending toward each other and in combination, over a major portion of the space between said projections to retain said tubular member in position between said projections, the free end portions of said lip members further being separated by a space which facilitates relatively quick removal and/or replacement of said tubular member between said projections, and heating means positioned within said unitary member to selectively provide heat such that said unitary member may be effectively operated over the windshield surface in cold weather conditions.

5. An apparatus according to claim 4 wherein said heating means is embedded within said unitary member.

* * * * *